No. 696,986. Patented Apr. 8, 1902.
J. LUDWIG & J. CARSTENS.
IMPLEMENT FOR DESTROYING PLANTS.
(Application filed Sept. 27, 1901.)
(No Model.) 2 Sheets—Sheet 1.
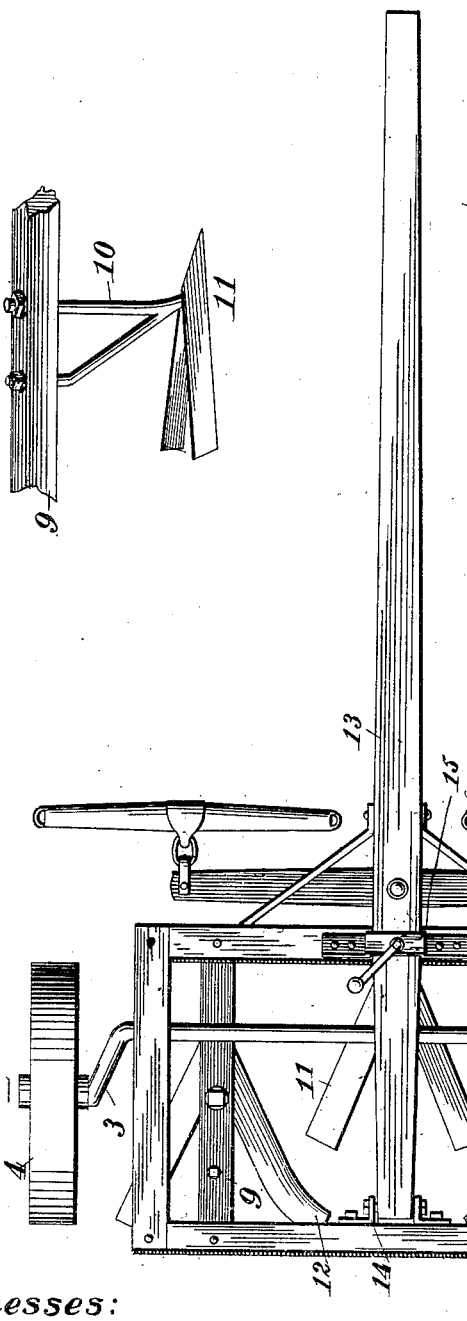
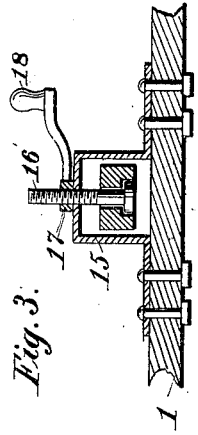
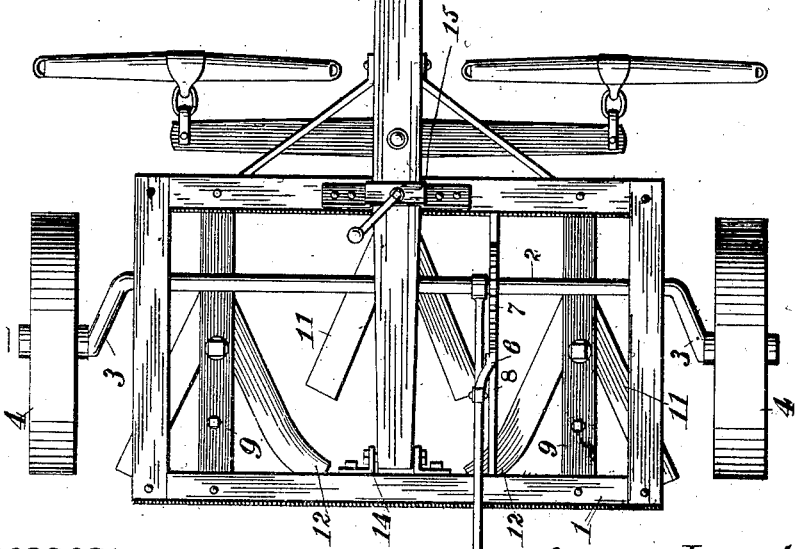
Witnesses: Inventors

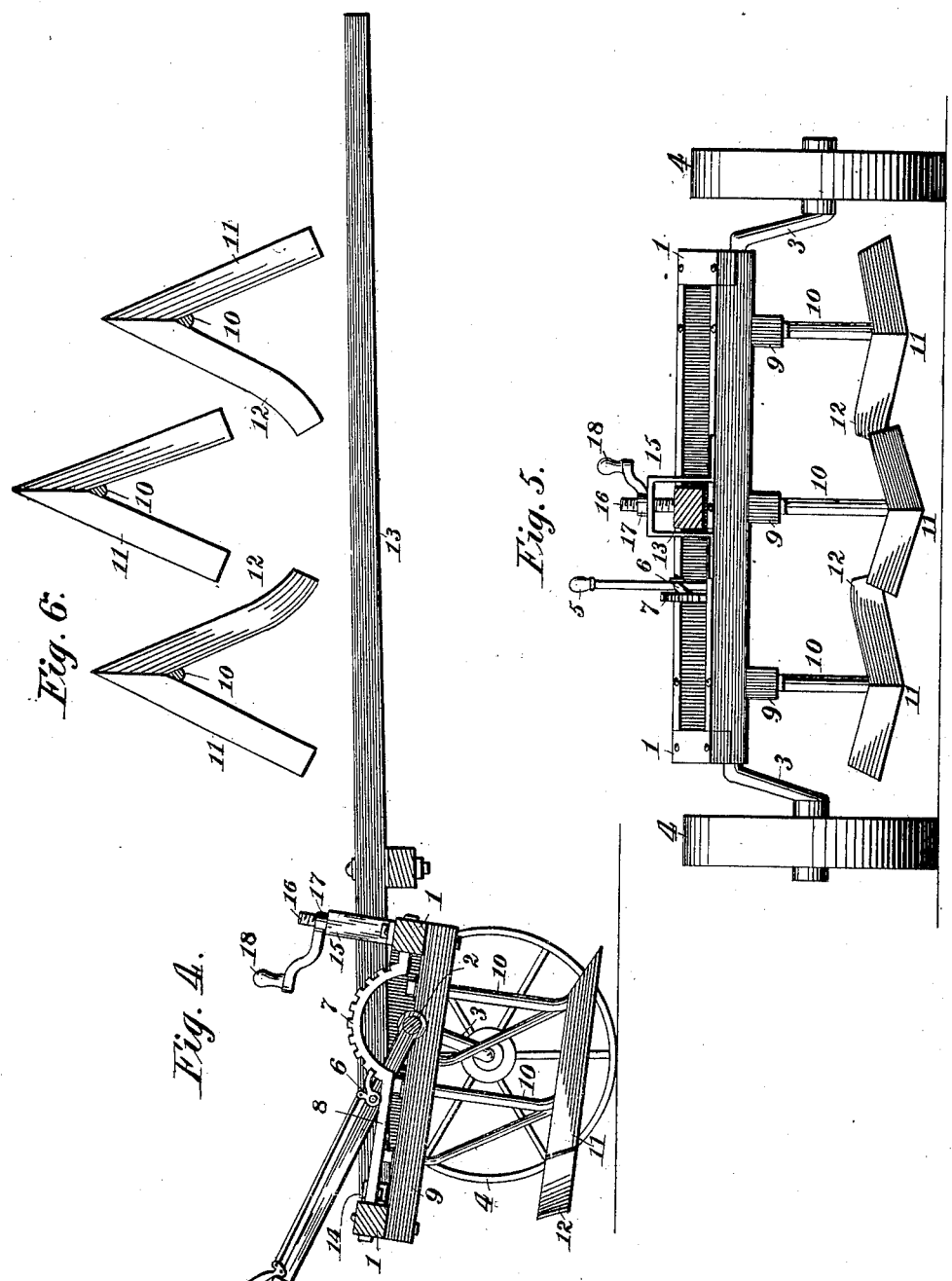

UNITED STATES PATENT OFFICE.

JOHN LUDWIG AND JOHN CARSTENS, OF NEWTONBURG, WISCONSIN.

IMPLEMENT FOR DESTROYING PLANTS.

SPECIFICATION forming part of Letters Patent No. 696,986, dated April 8, 1902.

Application filed September 27, 1901. Serial No. 76,740. (No model.)

*To all whom it may concern:*

Be it known that we, JOHN LUDWIG and JOHN CARSTENS, citizens of the United States, residing at Newtonburg, in the county of Manitowoc and State of Wisconsin, have invented a new and useful Improvement in Implements for Destroying Plants, of which the following is a specification.

Our invention has relation to implements for destroying plants—such as Canada thistles, &c.; and it consists in the novel construction and arrangement of its parts, as hereinafter described.

The object of our invention is to provide an implement adapted to cut the roots of plants. The implement is provided with a number of cutting-blades, which are adapted to pass below the surface of the ground. A means is provided for regulating the depth at which the blades shall go, and a means is provided for regulating the slant or pitch of the blades.

In the accompanying drawings, Figure 1 is a top plan view of the implement. Fig. 2 is a side view of one of the cutting-blades. Fig. 3 is a sectional view of the means for regulating the slant or pitch of the cutting-blades. Fig. 4 is a longitudinal sectional view of the implement. Fig. 5 is a transverse sectional view of the implement. Fig. 6 is a top plan view showing the relative position of the cutting-blades.

The implement consists of the rectangular frame 1, which is pivotally mounted upon the axle 2, said axle having near each end the downwardly-inclined sections 3 3, to the lower ends of which the wheels 4 4 are journaled. The lever 5 is fixed at one end to the axle 2, said lever having an ordinary grip-operated dog 6, which is adapted to engage the ratchets of the segment 7. The said segment is formed in the iron rod 8, which extends from the rear to the front of the frame 1.

To the under side of the frame 1 the parallel bars 9 are attached, and depending from each said bar is a standard 10, upon the lower end of which is mounted a cutting-blade 11. As shown in the drawings, three cutting-blades are provided, and the middle blade is set a little ahead of those on the sides. The cutting-blades are pointed at their forward ends and are provided on each side with a cutting edge, which extends back at an angle to each other. The inner rear ends of the side cutting-blades are curved toward each other, as at 12, the said curved portions extending behind the rear ends of the middle cutting-blade, the object of which will be hereinafter explained.

The rear end of the tongue 13 is pivotally attached to the rear portion of the frame 1, as at 14. Said tongue passes under the yoke 15, fixed to the front edge of the said frame 1. A bolt 16 passes through said tongue and up through a registering perforation in the top of the yoke 15. The upper end of the said bolt 16 is threaded and enters an internally-threaded collar 17, said collar 17 having a suitable handle 18.

The operation of the implement is as follows: Presuming the parts to be in the positions as shown in Fig. 4, the cutting-blades 11 are elevated out of the ground, and the implement can be readily taken along a road or from one field to another. When it is the desire of the operator to have the cutting-blades enter the ground, he grasps the lever 5 and disengages the dog 6 from the ratchets of the segment 7, passes the upper end of the lever forward, and permits the dog to engage the ratchets. This movement causes the axle 2 to make a partial revolution, which swings the sections 3 3 to the rear, which causes the frame 1 and its attachments to descend, the cutting-blades 11 entering the ground. The depth at which the cutting-blades shall work under the ground is regulated by the operator, as by throwing the lever 5 as far as possible to the front the said blades are caused to enter the ground at the maximum depth, and this depth may be diminished by drawing the lever 5 to the rear. When the cutting-blades 11 are moving forward under the ground, their cutting edges come in contact with the roots of plants, severing them, and thus destroying the plants. Should the middle cutting-blade engage a very tough root and fail to cut it, but simply shunt it to one side as the blade passes, the said root will come in contact with one of the inwardly-curved blades, which will give the root more of a shearing cut and complete its severance. The slant or tilt of the cutting-blades in the ground is regulated by manipulating the handle 18. The tongue 13 will at all times remain substantially horizontal. The said tongue being pivoted at its rear end to the rear part of the frame 1 and passing under the yoke 15 at the front edge of the said frame, by manipulating the handle 18 and collar 17 on the bolt 16, which passes through the yoke and the tongue, the forward edge of the frame 1 may be elevated or depressed with relation to the tongue 13. Thus the angle of the slant of the cutting-blades 11 may be regulated.

Having described our invention, what we claim as new, and desire to secure by Letters Patent, is—

In an implement of the character as described, a series of cutting-blades suitably carried, the middle cutting-blade having straight cutting edges, the side cutting-blades having their inner rear cutting edges curved in behind the cutting edges of the middle cutting-blade.

In testimony whereof we hereunto fix our signatures in the presence of two witnesses.

JOHN LUDWIG.
JOHN X CARSTENS.
his
mark

Witnesses:
ERNST TRUETTNER,
AUGUST KRUEGER.